June 21, 1960 G. WOLFF 2,942,252
DIGITAL ENCODER
Filed March 3, 1958

INVENTOR.
GUNTHER WOLFF
BY
ATTORNEY

# United States Patent Office 2,942,252
Patented June 21, 1960

2,942,252
DIGITAL ENCODER

Gunther Wolff, Westport, Conn., assignor to Machine Tool Automation, Inc., Southport, Conn.

Filed Mar. 3, 1958, Ser. No. 718,691

8 Claims. (Cl. 340—347)

The present invention relates to digital encoders, and particularly to a new and improved digital encoder capable of converting a movement of a member in space into coded electrical signals.

The principal object of this invention is to provide a digital encoder which is responsive to the movement of a member in space to indicate or record the position of said member in space.

Another object of this invention is to provide such an encoder in which the indicated or recorded position is represented by the presence or absence of voltage in pre-arranged coded circuits.

Another object of this invention is to provide such an encoder including rotary and stationary transducer members between which substantially no mechanical friction or electrical conduction exists.

Another object of this invention is to provide such an encoder having substantially limitless life, capable of operation at extremely high speeds and imposing minimum torque requirements on its driving mechanism.

Another object of this invention is to provide such an encoder that will operate on the usual sources of electrical power and require no frequency conversion.

Another object of this invention is to provide such an encoder requiring a minimum of production skill to manufacture.

Another object of this invention is to provide such an encoder in which linear motion is accurately converted into rotary motion under severe environmental conditions.

Another object of this invention is to provide such an encoder in which stationary and rotary members forming transducer means vary the magnetic flux in a magnetic circuit to thereby vary an induced voltage in pre-arranged coded circuits.

In one aspect of the invention, a linearly movable tape or member having accurately spaced means thereon may cooperate with a rotary wheel or drum about the periphery of which may be located other accurately spaced means so that any linear movement of the tape is converted into an exactly equivalent rotary motion.

In another aspect of the invention, the rotary motion may be transferred to a plurality of rotary members that may be caused to rotate at different ratios. An equal number of stationary members may be provided for co-operation with the rotary members. The rotary and stationary members may form transducer means, the number of which is only limited by the total range of movement and/or the degree of accuracy desired to be indicated or recorded. Certain of the transducer means may include a plurality of magnetic circuit means in which induced voltages may be present or absent. Other of the transducer means may possess pre-arranged codified means which will cause the presence of absence of an induced voltage in a coil linking with the magnetic circuit means in response to relative movement between the rotary and stationary members which form the transducer means.

The resulting voltages induced in the coils linking with the magnetic circuits of the transducer means may be amplified and compared with voltages produced by a programming device, and any discrepancy between them may be employed to cause movement of the linearly movable member until correspondence between the transducer voltages and the program voltages occurs.

The above, other objects and novel features of the invention will become apparent from the following specification and accompanying drawing, which is merely exemplary.

Figure 1:
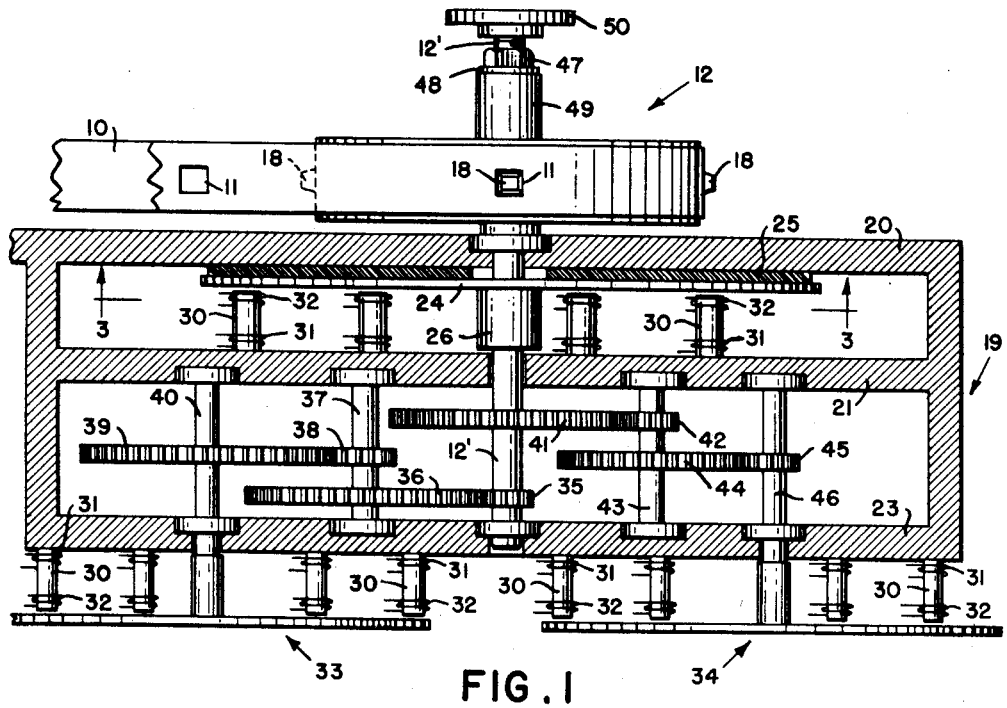
Figure 1 is a partial sectional elevational view of a digital encoder to which the principles of the invention have been applied.

Referring to the drawing, and particularly to Fig. 1, the principles of the invention are shown as applied to a digital encoder including a motion transmitting member 10, which may be made from a thin strip of steel in which may be formed accurately spaced openings 11 therealong. The openings may be punched in the steel strip by an indexing die or other accurate punching means.

The strip or tape 10 may pass around a specially designed sprocket wheel 12 fixed to a shaft 12' and having teeth mounted on its periphery for cooperation with the openings 11 of the strip or tape 10.

Figure 2:
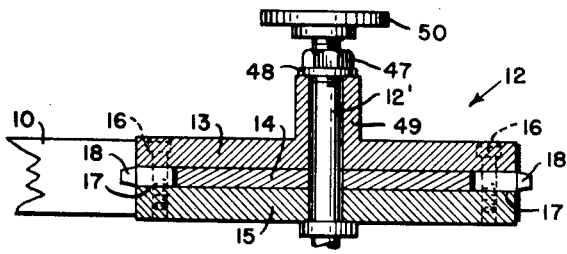
Fig. 2 is a sectional elevational view taken substantially along the centerline of a portion of the apparatus of Fig. 1.
Figure 3:
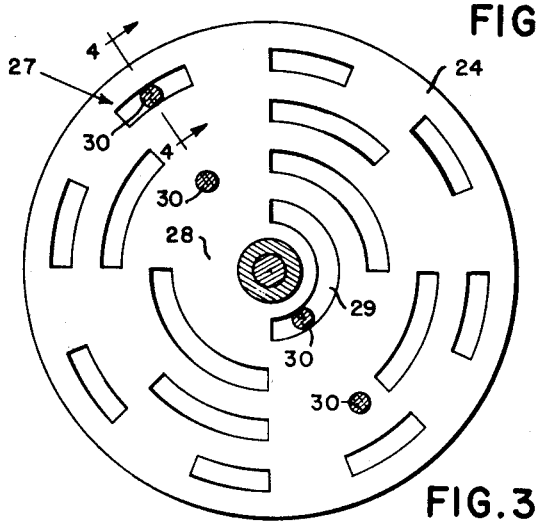
Fig. 3 is a sectional plan view taken substantially along line 3—3 of Fig. 1.
Figure 4:
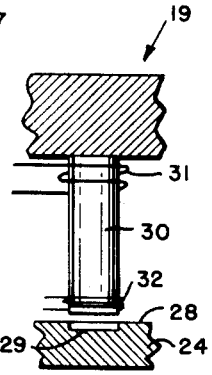
Fig. 4 is a sectional elevational view taken substantially along line 4—4 of Fig. 3.

Referring to Fig. 2, the sprocket wheel 12 may include three plates 13, 14 and 15 that are adapted to be clamped together by screws 16. The inner disc 14 may be provided with clearance slots 17 for adjustably receiving hardened and ground removable teeth 18. A portion of each tooth 18 is slightly tapered to provide for slight adjustment to compensate for any manufacturing variations in tooth or hole size. The inner disc 14 may be slightly thinner than the thickness of the teeth 18 so that upon tightening the screws 16, the teeth are held by friction in adjusted position relatively to the discs 13, 14 and 15.

From the foregoing it is evident that the pitch diameter of the sprocket 12 can easily be made within extremely fine tolerances by grinding the outside diameter of discs 13 and 15 concentric with the shaft 12' with the teeth 18 removed. Due to the slight taper and the radial adjustability of the teeth 18, shape errors of the teeth and openings 11 can easily be compensated.

The one end of tape 10 may be fixed to any member, the linear movement in space of which is desired to be indicated or recorded. The opposite end of tape 10 may pass over an idler pulley and be connected to the opposite end of the linearly movable member from that connected to the first mentioned end of tape 10, or it may be connected to a conventional spring actuated take-up device.

From the foregoing it is evident that any linear movement imparted to the tape 10 will be converted into an exactly equivalent angular motion of the shaft 12'. In order to convert the angular movement of shaft 12' into digital intelligence that, in turn, can be utilized to indicate or record the position of the linearly movable member, transducer means may be employed. This means may comprise rotary and stationary means, one of which may embody elements arranged in accordance with any desired codification. While the rotary members may be drum-like or discs or any other convenient form, they will be described in the embodiment shown as discs.

The shaft 12' may extend into a housing 19 having an upper wall 20, an intermediate wall 21, and a lower wall 23. A disc 24 may be fixed to shaft 12' for rotation therewith. A synthetic resin insert 25 may be located between the disc 24 and the inner face of the wall 20, and a sleeve 26 integral with disc 24 and concentric with shaft 12' may extend to a point in near contact with the upper surface of wall 21, all for a purpose to be described later.

The lower surface of disc 24 may be provided with a series of elements or means 27 that may be arranged in accordance with any desired codification. In the embodiment disclosed, the means 27 comprise paths concentrically disposed relatively to the shaft 12' and containing raised or elevated portions 28 and depressed portions 29 arranged in accordance with a binary code. The number of concentric paths is only limited by the degree of accuracy required to be indicated or recorded.

Soft iron pick-off cores 30 may be stationarily mounted on the top surface of wall 21 and extend upwardly to within a near contact position with respect to the raised portions 28 on the disc 24. There will be a pick-off core 30 for each concentric path of raised and depressed portions 28 and 29, and in the embodiment disclosed they are alternately located on each side of shaft 12' along a diametrical line. In this way, a maximum number of such pick-off cores can be arranged within a minimum of space, although if space economy is not essential, they may be all located on one side of shaft 12'. Additionally, for space economy reasons, they may be arranged in peripheral spaced relation.

Each of the pick-off cores 30 may be provided with an exciter coil 31. The coils 31 may continuously have impressed across them a voltage for providing a predetermined flux density within the soft iron material of the cores 30. Additionally, each core 30 may have a wafer type induction coil 32 surrounding it and of as thin a construction as is practical. This thin, wafer-like coil preferably should be located as close to the end of the pick-off core that is in near contact with disc 24 as is practical. In other words, the coil 32 should be of such construction and location relatively to the elevated means 28 and the soft iron of the core so that substantially only the flux through the disc 24 will induce a voltage in it. It is, of course, within the scope of this invention to provide the soft iron core 30 with a bifurcated construction at the end thereof in near contact with the disc 24, and around each tang of which bifurcated construction a separate wafer coil such as coil 32 may be wound for purposes of assisting in ambiguity resolution.

The construction and arrangement are such that as a depressed means 29 is directly beneath the soft iron core material within a wafer coil 32, negligible induced voltage will appear in the wafer coil; and, when a raised means 28 is directly beneath the iron core material within a wafer coil 32, an induced voltage of substantial magnitude will appear in the wafer coil.

The plastic insert 25 maintains a minimum run-out of the disc 24 relatively to the pick-off cores 30, and the construction of the sleeve 26 forms a low reluctance magnetic path.

The resulting voltages induced in the coils 32 by the action of the raised means 28 on the disc 24 may be amplified and compared with voltages produced by a conventional programming device and any discrepancy between them may be employed to cause movement of the linearly movable member connected to the tape 10 in a direction and an amount until correspondence between said induced voltages and program voltages occurs.

There may be any number of rotary means such as disc 24 and stationary means such as pick-off cores 30 forming transducer means that may be geared to the shaft 12' in different ratios as are necessary to cover any desired range of movement of the linearly movable member that is connected to the tape 10.

In the embodiment disclosed, two additional transducer means 33 and 34 are provided. The transducer means 33 is identical to that comprising disc 24 and pick-off cores 30, but it is geared to shaft 12' in a step-down manner, and, in the present embodiment, so as to rotate one revolution to every sixteen revolutions of shaft 12'. Accordingly, a gear 35, fixed to shaft 12', meshes with a gear 36 in a 1:4 ratio. Gear 36 is journaled on a shaft 37 mounted between walls 21 and 23 of housing 19. A gear 38 fixed to gear 36 meshes with a gear 39 in a 1:4 ratio. The gear 39 is keyed to a shaft 40 to which the rotary member of the transducer 33 is also fixed.

The transducer means 34 is identical to that comprising disc 24 and pick-off cores 30, but it is geared to shaft 12' in a step-up manner and, in the embodiment disclosed, so as to rotate sixteen times for each revolution of shaft 12'. Accordingly, a gear 41 fixed to shaft 12' meshes with a gear 42 in a 4:1 ratio. Gear 42 is journaled on a shaft 43 that is mounted between walls 21 and 23 of housing 19. A gear 44 fixed to gear 42 meshes with a gear 45 in a 4:1 ratio. The gear 45 is keyed to a shaft 46 to which the rotary member of the transducer 34 is also fixed.

From the foregoing it is evident that in the embodiment disclosed, a single revolution of the rotary disc of transducer 33 represents the total range of movement of the linearly movable member that is connected to the tape 10. Each revolution of the disc 24 represents $1/16$ of the total range of movement of the linearly movable member; and, each revolution of the rotary disc of the transducer 34 represents $1/256$ of the total range of movement of the linearly movable member.

In the embodiment disclosed, there are on each rotating disc of a transducer means, "on" and "off" conditions amounting to two, four, eight and sixteen, respectively, on the concentric paths from the smallest diameter to the largest. Merely as an example, assume the total linear movement of the member attached to tape 10 is arbitrarily sixteen inches, and that the programming mechanism has set up on it intelligence which represents program voltages corresponding to the linearly movable member being at any point within the assumed sixteen inches of movement. Assume further that the actual location of the linearly movable member produces induced voltages in the coils linking with the magnetic circuits which when amplified correspond to a different position within said sixteen inches of movement.

With the program voltages being in error relatively to the amplified magnetic circuit voltages, conventional means may be actuated to cause movement of the linearly movable member in the correct direction to reduce the error between the respective voltages.

Since one revolution of the rotating member of transducer 33 represents 16 inches; one revolution of disc 24 represents one inch; and one revolution of the rotating member of transducer 34 represents $1/16$ of an inch, when the respective program and amplified magnetic circuit voltages have become matched, the linearly movable member will be in a position within the sixteen inches of travel as represented by the program voltages to the nearest $1/256$ of an inch.

A zero setting may be provided for the transducer means relatively to the angular position of the sprocket 12 and correspondingly relatively to the linear position in space of the member, the movement or position of which is desired to be indicated or recorded. In the embodiment shown, a lock nut 47 may be threaded onto the one end of shaft 12' for cooperation with a washer 48 that rests on a hub 49 of the disc 13. A knurled disc 50 may be pinned to the end of shaft 12'. Accordingly, by loosening nut 47, shaft 12' and the various transducer means may be adjusted relatively to the sprocket 12, after which they may be locked in a desired position by tightening nut 47.

Although the various features of the new and improved digital encoder have been shown and described in detail to fully disclose one embodiment of the invention, it will be evident that numerous changes may be made in such details, and certain features may be used without others without departing from the principles of the invention.

What is claimed is:

1. In a digital encoder, stationary and movable means; signal sensing means comprising stationary pick-off coils and stationary exciting coils; and means for varying the magnetic flux linking with the exciting and the pick-off coils, in response to the movement of said movable means, said pick-off coils having output voltages directly proportional to the number of flux linkages.

2. In a digital encoder, stationary and angularly movable means; signal sensing means comprising stationary pick-off coils and stationary exciting coils; and means for varying the magnetic flux linking with the exciting and the pick-off coils, in response to the movement of said angularly movable means, said pick-off coils having output voltages directly proportional to the number of flux linkages.

3. In a digital encoder, stationary and linearly movable means; signal sensing means comprising stationary pick-off coils and stationary exciting coils; and means for varying the magnetic flux linking with the exciting and the pick-off coils, in response to the movement of said linearly movable means, said pick-off coils having output voltages directly proportional to the number of flux linkages.

4. In a digital encoder, stationary means and a linearly movable tape having accurately spaced means therealong; a sprocket around which said tape is wound; signal sensing means comprising stationary pick-off coils and stationary exciting coils; and means for varying the magnetic flux linking with the exciting and the pick-off coils, in response to the movement of said tape; said pick-off coils having output voltages directly proportional to the number of flux linkages.

5. In a digital encoder, stationary means and a linearly movable tape having accurately spaced punched holes therealong; a sprocket having radially adjustable teeth about its periphery for cooperation with said punched holes; signal sensing means comprising stationary pick-off coils and stationary exciting coils; and means for varying the magnetic flux linking with the exciting and the pick-off coils, in response to the movement of said tape; said pick-off coils having output voltages directly proportional to the number of flux linkages.

6. In a digital encoder, stationary and movable means; signal sensing means comprising stationary pick-off coils and stationary exciting coils; and elevated and depressed portions on the codified portion of said movable means; said surface variations resulting in a variation in the reluctance of, and hence the flux in, the magnetic circuit linking with the exciting and the pick-off coils, in response to the movement of said movable means, said pick-off coils having output voltages directly proportional to the number of flux linkages.

7. In a digital encoder, stationary and movable means; signal sensing means comprising stationary pick-off coils and stationary exciting coils; and variable reluctance codified means for varying the magnetic flux linking with the exciting and the pick-off coils, in response to the movement of said movable means, said pick-off coils constructed as a thin, wafer-like coil and located in close proximity to said codified means.

8. In a digital encoder, stationary and movable means; signal sensing means comprising stationary pick-off coils and stationary exciting coils, and variable reluctance codified means for varying the magnetic flux linking with the exciting and the pick-off coils, in response to the movement of said movable means, said pick-off coils constructed as a thin, wafer-like coil and located in close proximity to said codified means; plastic insert located behind the read-line on the codified means to minimize variations in the air gap.

References Cited in the file of this patent

UNITED STATES PATENTS

| | | |
|---|---|---|
| 1,237,808 | Ottinger | Aug. 21, 1917 |
| 2,546,155 | Haber | Mar. 27, 1951 |
| 2,666,912 | Gow | Jan. 19, 1954 |
| 2,765,459 | Winter | Oct. 2, 1956 |
| 2,766,445 | Bland | Oct. 9, 1956 |